United States Patent [19]

Kalka et al.

[11] 4,133,947

[45] Jan. 9, 1979

[54] PROCESS FOR PRODUCTION OF POLYMERS OF VINYL CHLORIDE FOR PASTE PREPARATION USING SPRAY-DRYING

[75] Inventors: Josef Kalka, Herten; Hermann Winter; Alfred Kania, both of Marl, all of Fed. Rep. of Germany

[73] Assignee: Chemische Werke Huels Aktiengesellschaft, Fed. Rep. of Germany

[21] Appl. No.: 703,232

[22] Filed: Jul. 7, 1976

[30] Foreign Application Priority Data

Jul. 16, 1975 [DE] Fed. Rep. of Germany ....... 2531780

[51] Int. Cl.$^2$ .......................... C08F 6/14; C08F 2/26; C08F 14/06
[52] U.S. Cl. .................................... 528/502; 526/216; 526/344.2; 528/486
[58] Field of Search ...................... 526/216, 344, 345; 528/502, 486

[56] References Cited

U.S. PATENT DOCUMENTS

| | | | |
|---|---|---|---|
| 2,721,859 | 10/1955 | Fuhrman | 526/344 X |
| 2,829,134 | 4/1958 | DeCoene | 526/216 |
| 3,840,507 | 10/1974 | Bagby | 526/344 X |
| 3,883,494 | 5/1975 | Winter | 526/344 X |

FOREIGN PATENT DOCUMENTS

| | | | |
|---|---|---|---|
| 6726860 | 12/1967 | Japan | 526/216 |
| 724558 | 2/1955 | United Kingdom | 526/216 |
| 784283 | 10/1957 | United Kingdom | 526/216 |
| 834810 | 5/1960 | United Kingdom | 526/216 |

*Primary Examiner*—Christopher A. Henderson, Jr.
*Attorney, Agent, or Firm*—Millen & White

[57] ABSTRACT

An improved process for the aqueous emulsion polymerization of vinyl chloride to be spray-dried and thus form paste-yielding polymers wherein the polymerization is conducted in an emulsion containing at least 45% by weight of monomers together with an emulsifying amount of alkali metal fatty acid salts of 8–18 carbon atoms at a pH of 9.5–11.5, and wherein the pH is reduced to a value between 6 and 7.5 prior to spray-drying or to a value between 4 and 7.5 during the spray-drying step.

8 Claims, No Drawings

PROCESS FOR PRODUCTION OF POLYMERS OF VINYL CHLORIDE FOR PASTE PREPARATION USING SPRAY-DRYING

BACKGROUND OF THE INVENTION

This invention relates to a process for the production of polymers of vinyl chloride which can be turned into a paste which process comprises polymerization in the presence of water-soluble catalysts and carboxylic acid salts as emulsifiers.

It has been known to produce polymers of vinyl chloride suitable for paste preparation in the presence of alkali salts of fatty acids as the emulsifiers, wherein the polymerization is conducted in an alkaline medium. Since the alkali metal salts of fatty acids have pH values of at least 9.5 in an aqueous medium they are thus fully effective as emulsifiers only at such pH values.

Polymers are obtained by the polymerization in the presence of alkali salts of fatty acids as emulsifiers which have a considerably higher thermal stability as compared to similar polymers obtained by the polymerization in the presence of alkyl sulfates, alkyl and alkylaryl sulfonates and other conventional emulsifiers. The polymers produced with alkali salts of fatty acids result, however, in pastes of unsatisfactorily high viscosities when used as plastisol material. Accordingly, there exists a need for obtaining vinyl chloride polymers combining good thermal stability with lower plastisol viscosity.

OBJECTS OF THE INVENTION

Accordingly, it is a general object of this invention to provide a process for preparing such polymers using existing equipment and reactants.

A more particular object of this invention is to improve the plastisol properties of vinyl chloride polymers prepared by emulsion polymerization using alkali metal salts of fatty acids as an emulsifier.

A further object of this invention is to provide such a process which gives vinyl chloride polymers having improved plastisol properties in good yields.

Upon study of the specification and appended claims, further objects and advantages of this invention will become apparent to those skilled in the art.

SUMMARY OF THE INVENTION

Briefly, the above and other objects, features and advantages of the present invention are attained in one aspect thereof by providing in a process for the production of powdery polymers of vinyl chloride containing no more than 2% by weight of particles having a diameter greater than 40 microns which comprises aqueous emulsion polymerization in the presence of water-soluble free radical generating catalysts and carboxylic acid salt emulsifiers at a pH of between 8.5 and 11 and spray-drying the thus-obtained latex, the improvement which comprises:

(i) conducting the polymerization in an emulsion containing at least 45% by weight of monomers in the presence of sodium or potassium salts of fatty acids of 8-18 carbon atoms as the emulsifiers, either (a) discontinuously in reactors having a capacity of at least 6 m$^3$ in the presence of no more than 1% by weight of emulsifier, based on the polyvinyl chloride, above a conversion of 30% in a pH range of 9.5-11.5 up to a conversion of at least 80%; or (b) continuously in the presence of no more than 2% by weight of emulsifier, based on the polyvinyl chloride, in a pH range of 9.5-11.5 up to a conversion of at least 80%; and (ii) adjusting the pH of the resultant polymer dispersion to a pH of 6-7.5 before the spray-drying step or to a pH of 4-7.5 during the spray-drying step.

DETAILED DISCUSSION

The present invention provides a method for improving the plastisol properties of vinyl chloride polymers prepared with alkali salts of fatty acids as the emulsifiers, wherein the polymerization is conducted pursuant to the demands of modern technology in an emulsion containing at least 45% by weight of monomers, either discontinuously with an emulsifier content of at most 1% by weight, based on the polyvinyl chloride, in polymerization devices of at least 6 m$^3$ in volume, or continuously in the presence of at most 2% of emulsifier, based on the polyvinyl chloride.

A process has now been discovered for the production of polymers of vinyl chloride, which can be made into a paste, by the polymerization in aqueous emulsion in the presence of water-soluble catalysts and carboxylic acid salts as the emulsifiers at a pH of between 8.5 and 11 and by spray-drying the thus-obtained latex, according to which the polymerization is conducted in an emulsion containing at least 45% by weight of monomers in the presence of sodium or potassium salts of fatty acids of 8-18 carbon atoms as the emulsifiers either (a) discontinuously in reactors having a capacity of at least 6 m$^3$ in the presence of no more than 1% by weight of emulsifier, based on the polyvinyl chloride, above a conversion of 30% in a pH range of 9.5-11.5 up to a conversion of 80% or greater, preferably 85-95%; or (b) continuously in the presence of no more than 2% by weight of emulsifier, based on the polyvinyl chloride, in a pH range of 9.5-11.5 up to a conversion of at least 80%, preferably 85-93%; and thereafter the polymer dispersion obtained according to (a) or (b) is adjusted either to a pH of 6-7.5 before the spray-drying step or to a pH of 4-7.5 during the spray-drying step. In a specific embodiment of the process, pH adjustment is carried out in accordance with (a), the entire polymerization being conducted in a pH range of 9.5-11.5. In a preferred embodiment of the process, pH adjustment is carried out in accordance with (a), effecting the polymerization up to a conversion of 15% in a pH range of 6-6.5 and up to a conversion of 30% in a pH range of 6.5-7.5.

Although it has been known to produce polymers of vinyl chloride for paste preparation by the polymerization of vinyl chloride in an aqueous emulsion in the presence of fatty acid salts as emulsifiers in comparably low pH ranges (8.0-9.0) and subsequent spray-drying, (e.g. see German Patent No. 1,051,505, Example 2; U.S. Pat. No. 2,957,858), a polymerization in this pH range cannot be accomplished when maintaining high monomer concentrations (at least 45% by weight) and simultaneously low emulsifier concentrations, both requirements being essential in modern technical processes and thus also in connection with the method of the present invention; this can be seen from Comparative Examples 2, 3 and 5 reported below. The dispersion becomes unstable during polymerization even in the comparatively small 300-liter reactors, the agitating mechanisms of which exert relatively minor shearing forces, and coagulates below solids concentrations of 35-40%.

If, according to a special embodiment of this invention, the entire polymerization is effected discontinuously in a pH range of 9.5-11.5, and the thus-obtained latex is adjusted to pH between 6 and 7.5 before the spray-drying step, then polymers are obtained which can be processed into pastes having very satisfactory viscosity characteristics, e.g. as shown in Example 1. This effect, however, can be considerably improved according to an optimum embodiment of this invention by conducting the polymerization up to a conversion of 15% in a pH range of 6-6.5 and up to a conversion of 30% in a pH range of 6.5-7.5, and by raising, at a conversion of 30%, the pH to a value of 10-11.5, whereupon the polymerization is completed to 85-93% conversion in this pH range (Example 2).

Low pH values during the polymerization and/or during the initial stages thereof can be set by the metered feed or gradual addition of those acids, acidic salts or acid-forming compounds which do not impair the thermal stability of the final product. Suitable such compounds include but are not limited to acids, e.g. hydrochloric acid, oxalic acid, formic acid and sulfuric acid; acid-reacting salts, e.g. sodium bisulfate; alcohols which are oxidized to acids in the polymerization medium under the effect of the activators, e.g. glycerol and glycol; etc. It is also possible to use compounds having simultaneously an acid function which also act as a coactivator, e.g. ascorbic acid.

The alkalinization at a conversion of 30% can also be attained by adding the necessary amounts of NaOH, KOH, etc. as aqueous solutions. It is likewise possible to introduce the necessary amount of alkali with the emulsifier solution, if the emulsifier is added during the polymerization either continuously or according to a specific program.

The setting of a pH of 6-7.5 before the spray-drying of the latex or of 4-7.5 during the spray-drying can be accomplished with the same acidic compounds utilized for reducing the pH during the polymerization. The concentration and manner of addition of the acidic compounds during the pH reduction of the latex before the spray-drying step is chosen so that no local super-acid condition occurs, since this can lead to instantaneous coagulation. The admixing of aqueous solutions of the acidic compounds to the alkaline dispersion prior to spray-drying can be accomplished in a discontinuous operation in an agitator-equipped vessel, as well as continuously by mixing the dispersion with a solution of the acidic compound in a continuously operated stirrer vessel, or by mixing in a pipe provided with installations which cause the necessary turbulence. The step of lowering the pH of the dispersion takes place immediately before passing the mixture through the nozzles.

A very advantageous method of supplying the acidic compounds for the pH reduction before spray-drying the dispersion is to introduce the acidic compound into a dispersion conduit equipped with a mixing device directly before the spray-drying step.

The reduction of the pH value under heating is especially efficient with a view toward low viscosities of the thus-produced pastes. The dispersion (the latex) is heated, for this purpose, to 30°-60° C. before the acidic compound is admixed thereto or, if there are no rather long distances and time periods between the polymerization reactor and thr spray dryer, the dispersion is treated with the acidic compound while the former is still warm from the polymerizing step.

An optimum method for reducing the pH of the polymer dispersion is the introduction of the necessary quantity of the acidic compound during the spray-drying step, as demonstrated by the results of Examples 4-6 in Table 1 shown below. It is possible to pass an aqueous solution of the acidic compound into the nozzles of the spray dryer together with the polymer dispersion, by allowing the acidic-aqueous solution to enter the spray tower via additionally installed nozzles together with the dispersion. In this connection, it is important that a homogeneous distribution of the acidic compound in the dispersion be achieved during the spray-drying step. The nozzles, for this reason, are to be arranged in the tower in a uniform distribution. It is possible to utilize binary as well as unary nozzles.

It is also possible to add to the warm drying air a gas-forming acidic solution in an aqueous medium, e.g. $HCl$, $SO_3$, $SO_2$, $CO_2$.

The process of this invention is in principle applicable to the manufacture of all homo- and copolymers of vinyl chloride which can be turned into a paste. Suitable comonomers are well known in the art and include but are not limited to monoolefinic unsaturated compounds, e.g. vinylidene chloride or vinyl esters of straight-chain or branched carboxylic acids of 2-20, preferably 2-4 carbon atoms, such as vinyl acetate, vinyl propionate, vinyl butyrate, etc; unsaturated acids, e.g. maleic, fumaric, itaconic, crotonic, acrylic or methacrylic acid as well as the mono- or diesters thereof with mono- or dialcohols of 1-10 carbon atoms; $\alpha$-olefins, e.g. ethylene, propylene, isobutylene, styrene, etc; acrylonitrile; polyunsaturated compounds, e.g. conjugated diolefins; etc. The comonomers can generally be present in the polymerization batch to an extent of up to 30% by weight.

Suitable catalysts are the water-soluble compounds customarily employed during the emulsion polymerization of vinyl chloride, which include but are not limited to water-soluble persulfates, e.g. Na or K persulfate, optionally combined with a reducing component, such as water-soluble bisulfite, hydrosulfite hydrazine, thiosulfate, formaldehyde sulfoxylates, etc.; hydrogen peroxide combined with reducing components such as bisulfite, hydrazine, hydroxylamine or ascorbic acid; water-soluble persulfate combined with hydrogen peroxide and an activating component, such as copper salts, which are to be used in an alkaline medium together with complexing agents, such as pyrophosphates; etc. The usual concentrations are employed. Additional catalysts which can be used when polymerizing vinyl chloride in an aqueous emulsion are, for example, those described by Bovey Kolthoff et al., "Emulsionpolymerisation" [Emulsion Polymerization], New York, 1955, pp. 59-93.

Advantageous emulsifiers are the Na or K salts of unbranched fatty acids of 8-18 carbon atoms, e.g. sodium or potassium caprate, sodium or potassium laurate, sodium or potassium myristate, sodium or potassium palmitate, sodium or potassium stearate. Sodium laurate and sodium myristate are preferred.

The dispersions obtained by discontinuous polymerization (latices) are to contain no more than 1.0% by weight of emulsifier, and the dispersions produced by continuous polymerization are to contain no more than 2% by weight of emulsifier, based on the polyvinyl chloride, since high emulsifier concentrations have a disadvantageous effect in the final products and during processing. They impair the transparency and increase the water sensitivity, as well as the electrical values of the polymers and the articles manufactured therefrom.

The paste-yielding polymers are additionally to be produced in high-percentage emulsions, namely those containing at least 45% by weight of monomers, in order to justify the economical requirements which must be met by a modern technical process. High monomer concentrations ensure a high space-time yield in the polymerization reactor as well as in the spray-drying tower and additionally reduce the energy consumption during the spray-drying step.

A suitable discontinuous mode of operation permitting the production of especially high-percentage, low-emulsifier polymer dispersions is described in DAS [German Published Application] No. 1,964,029, according to which the emulsifier is added during the polymerization procedure according to a specific program. The polymerization can take place at the customary temperatures of between 35° and 70° C. under pressures of 5.5 bars to 13 bars. The polymerization reactors have capacities of at least 6 m³, preferably at least 40 m³, in particular 200 m³.

Paste-yielding polymers are understood to mean powders which can be worked into a paste and which contain no more than about 2% by weight of components larger than 40μ.

The spray-drying step can be conducted in conventional spray-drying devices, as they are described, for example, in "Ullmanns Encyclopaedie der technischen Chemie" [Ullmann's Encyclopedia of Technical Chemistry] 1951, vol. 1, pp. 602 et seq. A very well suited process of spray-drying vinyl chloride polymer dispersions, resulting in powders which initially have a particle size suitable for pastes, is described in DAS No. 2,146,753.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight.

The following Examples will serve to explain the process of this invention in greater detail. The paste viscosities listed in Table 1 were determined by the "Haake-Rotationsviskosimeter".

COMPARATIVE EXAMPLE 1

Under the exclusion of atmospheric oxygen, 2,200 l. of demineralized water is charged into a 6 m³ pressure vessel, along with a previously prepared solution of 60 g. of copper nitrate as the redox component and 1,440 g. of sodium pyrophosphate (as the complexing agent for the copper nitrate) in 5,000 g. of water. The charge is adjusted to pH 11.0. The reactor vessel is heated to about 56° C. Under agitation, 700 kg. of vinyl chloride and 20 l. of activator solution (3% solution of $K_2S_2O_8$ in water) are added to the mixture. After onset of the polymerization, emulsifier solution (3.5% strength solution of sodium laurate in water with an excess of 0.15 equivalents of NaOH, based on the lauric acid), vinyl chloride, and a 1.5% hydrogen superoxide solution are added in accordance with the following program:

| Hour | Emulsifier l. | Vinyl Chloride kg. | Hydrogen Peroxide l. | Conversion % |
|---|---|---|---|---|
| 0.75 | 3 = 115 g. | 500 | 5 | 5.5 |
| 1.5 | 6 = 250 g. | 500 | 5 | 10.5 |
| 2.25 | 11 = 385 g. | 500 | 5 | 28.2 |
| 3.0 | 48 = 1680 g. | 500 | 5 | 40.7 |
| 3.75 | 134 = 4690 g. | | | 53.5 |
| 4.5 | 230 = 8050 g. | | | 62.0 |
| 5.25 | 96 = 3360 g. | | | 67.5 |

The polymerization is terminated after about 6–7 hours. A latex is obtained having a dry content of 48%, the K-value is 70 (K-value method by Fikentscher: Lunge-Berl 1934/5, p. 945), the final pH is 11.0, the surface tension is 48 dyn/cm.; the emulsifier content is 0.75% by weight, based on the polyvinyl chloride. The thus-obtained dispersion is spray-dried in accordance with DOS [German Unexamined Laid-Open Application] No. 2,146,753; 60 parts by weight of the powder is made into a paste with 40 parts by weight of dioctyl phthalate, and the viscosity of the paste is measured after two hours by means of a Haake rotary viscometer. Table 1 shows the viscosities for several shear velocities.

COMPARATIVE EXAMPLE 2

Under the exclusion of atmospheric oxygen, a 300 l. pressure vessel is charged with 100 l. of demineralized water and with a previously prepared solution of 1.37 g. of copper nitrate in 33 g. of sodium pyrophosphate in 100 g. of water, as well as 0.1 l. of 5% ammonium laurate solution. Under agitation at 40 r.p.m., the autoclave is heated to 56° C. and then the mixture is combined with 100 l. of vinyl chloride and 1.5 l. of a 3% potassium persulfate solution. After onset of the polymerization, emulsifier solution (5% ammonium laurate solution with an excess of 15% $NH_4OH$, based on the lauric acid), vinyl chloride, and a 0.5% hydrogen peroxide solution are added in accordance with the following program:

| Hour | Emulsifier l. | Vinyl Chloride kg. | Hydrogen Peroxide l. | Conversion % |
|---|---|---|---|---|
| 0.5 | 0.1 = 5 g. | 15 | 1.5 | — |
| 1.0 | 0.2 = 10 g. | 15 | 1.0 | 15 |
| 1.5 | 0.6 = 30 g. | 15 | 0.5 | — |
| 2.0 | 1.0 = 50 g. | 5 | 0.25 | 30 |
| 2.5 | 5.0 = 250 g. | | | |
| 3.0 | 6.0 = 300 g. | | | 50 |
| 3.5 | 9.4 = 470 g. | | | |
| 4.0 | 5.4 = 270 g. | | | 75 |

The polymerization had to be terminated after 4–4.5 hours, since the dispersion was coagulated. In spite of repeated attempts, it was impossible to obtain a stable dispersion with 1% ammonium laurate, based on the polyvinyl chloride. The pH of the coagulated dispersion was 8.6.

COMPARATIVE EXAMPLE 3

Under the exclusion of atmospheric oxygen, a 6 m³ pressure vessel is charged with 2,200 l. of demineralized water. The reaction vessel is heated to about 56° C., and then charged with 700 kg. of vinyl chloride and 20 l. of a 3% potassium persulfate solution as the activator, along with 10 l. of a 3.5% sodium laurate solution as the emulsifier. After onset of the polymerization, a 1.5% hydrogen peroxide solution as the activator and a 0.8% ascorbic acid solution for pH regulation and as reducing agent, and vinyl chloride are added in metered amounts according to the following program:

| Hour | Emulsifier l. | Vinyl Chloride kg. | $H_2O_2$ l. | Ascorbic Acid l. |
|---|---|---|---|---|
| 0.75 | 3 = 115 g. | 500 | 5 | 20 |
| 1.5 | 6 = 250 g. | 500 | 5 | 5 |
| 2.25 | 11 = 385 g. | 500 | 5 | 5 |
| 3.0 | 48 = 1680 g. | 500 | 5 | |
| 3.75 | 96 = 3360 g. | | | |
| 4.5 | 134 = 4690 g. | | | |
| 5.25 | 230 = 8050 g. | | | |

The polymerization is finished after about 5.5-6 hours. The final pH is 8.8. Part of the dispersion coagulated already during the polymerization; the remainder could no longer be conveyed by pumping, so that the dispersion could not be passed through nozzles. The emulsifier content was 0.75% by weight, based on the polyvinyl chloride.

COMPARATIVE EXAMPLE 4

An autoclave having a capacity of 300 l. and being equipped with a jacket cooler and a vane-type agitator is charged, per hour, with:

14 l. of vinyl chloride
11.6 l. of an aqueous 2.0% sodium laurate solution (2% by weight, based on the polyvinyl chloride)
0.2 l. of a 3% aqueous potassium persulfate solution and
0.2 l. of a 0.5% aqueous hydrogen peroxide solution.

The autoclave is filled to an extent of 90%. The polymerization temperature is maintained at 46° C. The conversion is about 90%. A dispersion having a solids content of 49%, a pH of 9.5-9.7, and a surface tension of 37.4 dyn/cm. is continuously withdrawn from the bottom of the vessel.

The dispersion is spray-dried as indicated in Comparative Example 1. Table 2 discloses the paste viscosity of the powder, prepared into a paste with dioctyl phthalate in a ratio of 60:40.

COMPARATIVE EXAMPLE 5

The procedure of Comparative Example 4 is followed, but an attempt is made to set the pH at $\leq 9.3$ by using an excess of lauric acid during the preparation of the sodium laurate solution. As soon as the pH drops to 9.3, the dispersion becomes unstable and begins to coagulate.

EXAMPLE 1

20 liters of 0.4% formic acid is mixed with 100 l. of a dispersion prepared according to Comparative Example 1 and still at a temperature of 45° C., so that the pH of the dispersion is reduced to 7.5. The acid can be added by charging the dispersion into a stirred vessel and mixing the dispersion with the formic acid under agitation; or also by passing through the stirred vessel continuously the dispersion and 0.4% formic acid at a proportion of 10:2 with an average residence time of 15 minutes. The dispersion with a pH of 7.5 is spray-dried directly after reducing the pH, as described in DAS No. 2,146,753. The paste viscosity of the powder, of which 60 parts by weight was turned into a paste with 40 parts by weight of dioctyl phthalate, is indicated in Table 1.

EXAMPLE 2

Under the exclusion of atmospheric oxygen, a 6 m³ pressure vessel is charged with 2,200 l. of demineralized water and with a previously prepared solution of 60 g. of copper nitrate and 1,440 g. of sodium pyrophosphate in 5,000 g. of water. The reaction vessel is heated to about 56° C., and 700 kg. of vinyl chloride as well as 20 l. of a 3% potassium persulfate solution as the activator are added to the reaction mixture, along with 10 l. of a 3.5% sodium laurate solution as the emulsifier, a 1.5% hydrogen peroxide solution as the activator, and a 0.8% ascorbic acid solution for pH regulation and also additional vinyl chloride in accordance with the following program:

| Hour | Emulsifier l. | Vinyl Chloride kg. | $H_2O_2$ l. | Ascorbic Acid l. | pH | Conversion % |
|---|---|---|---|---|---|---|
| 0.75 | 3 = 115 g. | 500 | 5 | 20 | 6.1 | 6 |
| 1.5 | 6 = 250 g. | 500 | 5 | 5 | 6.3 | 11 |
| 2.25 | 11 = 385 g. | 500 | 5 | 5 | 6.6 | 29 |
| 3.0 | 48 = 1680 g. | 500 | 5 | | 10.3 | 45 |
| 3.75 | 96 = 3360 g. | | | | 10.4 | 62 |
| 4.5 | 134 = 4690 g. | | | | 10.5 | 70 |
| 5.25 | 230 = 8050 g. | | | | 11.0 | 80 |

After 2.5 hours, 1,000 g. of 50% sodium hydroxide solution is added to the polymerization mixture. The emulsifier solutions introduced after 3 hours of polymerizing contain respectively 250 g. of 50% sodium hydroxide solution.

The polymerization is terminated after about 5.5 to 6 hours. The dispersion has a dry content of 48%, the K-value is 70, the surface tension is 48 dyn/cm., and the emulsifier concentration is 0.75%, based on the solid matter.

Before the dispersion is spray-dried, the pH is reduced to pH 7.5 as in Example 1. A paste is prepared from the spray-dried powder with dioctyl phthalate (ratio 60:40), and the viscosity of the paste is determined after two hours of storage time. As can be seen from Table 1, the thus-obtained paste shows viscosities which are improved by the factor 12 as compared to the paste produced according to Comparative Example 1.

EXAMPLE 3

The dispersion prepared in Comparative Example 1 is passed through nozzles in a spraying tower equipped with 35 nozzles. The latter are of the type as disclosed in DOS No. 2,146,753. The 35 nozzles spray 1,800 kg. of dispersion per hour. Through three additional nozzles of the same type, 36 kg. of 2.5% formic acid is sprayed into the tower. The nozzles are distributed uniformly around the spray dryer. The nozzles have a nipple insert of an aperture diameter of 0.6 mm. and an intake level of 12 cm. The pH of the mixture present in the tower is 7.3. The paste viscosity of the pastes obtained with the powders, prepared in a ratio of 60:40, is set forth in Table 1.

The paste viscosity is improved by the factor 40 with respect to Comparative Example 1.

EXAMPLE 4

The process is conducted as described in Example 3, except that 1,800 kg. of dispersion per hour is sprayed together with 36 kg. of 5% hydrochloric acid. The pH of the mixture present in the tower is 4.8. The paste viscosity of the powders prepared into a paste at a ratio of 60:40 is set forth in Table 1. An improvement of the viscosity by the factor 60 is attained as regards Comparative Example 1.

EXAMPLE 5

A pressure vessel having a capacity of 40 m³ is charged, under the exclusion of atmospheric oxygen, with 12,600 l. of demineralized water, 6.2 kg. of 50% sodium hydroxide solution, 3.3 kg. of sodium pyrophosphate, 135 g. of copper nitrate and 185 l. of 3.75% sodium laurate solution. The pH of the charge is 12.2. The reactor is heated to 56° C. under agitation at 35 r.p.m., while simultaneously introducing 6,350 l. of vinyl chloride.

Then there are added a 3.70% sodium laurate solution having an excess of 0.15 equivalents of NaOH, based on the lauric acid, vinyl chloride, a 3% solution of $K_2S_2O_8$ in water and a 2.0% $H_2O_2$ solution in accordance with the following program:

| Hour | Emulsifier l. | Vinyl Chloride kg. | $K_2S_2O_8$ Solution l. | $H_2O_2$ Solution l. |
|---|---|---|---|---|
| 0.6 | 46 | 3,000 | 100 | 25 |
| 1.2 | 49 | 3,000 | 60 | 10 |
| 1.8 | 270 | 2,500 | | 5 |
| 2.4 | 743 | 2,000 | | |
| 3.0 | 1,200 | | | 5 |
| 3.6 | 507 | | | |

The polymerization is terminated after about 6 hours. The thus-obtained latex has a dry content of 48% and a pH of 11.5. The emulsifier content of the polyvinyl chloride is 0.75%.

The dispersion is spray-dried as set forth in Example 3. The pH of the mixture present in the tower is 7.0. The paste viscosity of the pastes obtained with the powder, prepared in a ratio of 60:40, is indicated in Table 1.

EXAMPLE 6

The polymerization is conducted as disclosed in Comparative Example 1, except that a mixture is polymerized consisting of 95% of vinyl chloride and 5% of vinyl acetate. The dispersion, obtained with 48% solids, is worked up as described in Example 3. The pH of the mixture in the tower is 7.0. The paste viscosity of the paste obtained with the powder, prepared in a ratio of 60:40, is indicated in Table 1.

EXAMPLE 7

The dispersion polymerized continuously in Comparative Example 4 is passed through nozzles during the spray-drying step conducted as described in Example 3, but 36 kg. of 50% formic acid is sprayed per hour into the tower for the same amount of dispersion. The pH of the mixture present in the tower is 7.2. The paste viscosity is set forth in Table 1. As compared to Comparative Example 4, this paste viscosity is improved by the factor 40.

EXAMPLE 8

The spray-drying step of Example 7 is conducted, but with the use of 5% hydrochloric acid in the amount of 18 kg. in place of the formic acid. The pH is 6.0; the paste viscosity is indicated in Table 1. This paste viscosity is improved by the factor 150 with respect to Comparative Example 4.

TABLE 1

| | Paste Viscosity (poises) at Shear Velocities ($sec^{-1}$) of | | | |
|---|---|---|---|---|
| | 0.3 | 1.0 | 10.0 | 100 |
| Comp. Ex. 1 | 12,000 | 4,000 | 500 | 100 |
| Comp. Ex. 2 | — | — | — | — |
| Comp. Ex. 3 | — | — | — | — |
| Comp. Ex. 4 | 12,000 | 4,000 | 500 | 100 |
| Comp. Ex. 5 | — | — | — | — |
| Example 1 | 1,000 | 500 | 200 | 100 |
| Example 2 | 600 | 300 | 120 | 100 |
| Example 3 | 300 | 160 | 100 | 90 |
| Example 4 | 200 | 100 | 80 | 80 |
| Example 5 | 270 | 150 | 90 | 85 |
| Example 6 | 350 | 180 | 110 | 100 |
| Example 7 | 300 | 200 | 150 | 100 |
| Example 8 | 80 | 70 | 70 | 70 |

Testing the Thermal Stability of Emulsion Polyvinyl Chloride Produced with the Use of Various Types of Emulsifiers The polyvinyl chloride powder to be investigated is mixed in a porcelain dish with plasticizer and stabilizer in the following ratio:
100 parts by weight of polyvinyl chloride
30 parts by weight of dioctyl phthalate
1 part by weight of Ba-Cd stabilizer (by Barlocher)*)
*) Trade name "Bar"

The mixture is rolled for 5 minutes on a roller frame and then drawn to a sheet having a thickness of 1.0 mm. Squares of 18 × 18 mm. are punched out from the sheet and subjected to a temperature load of 180° C. in a rotary "Brabender" heating furnace. Samples are taken at time intervals of 5 minutes. The thermal load is recognizable from the discoloration. The time elapsed up to immediately before the sample turns black is indicated as the measure for the thermostability in Table 2.

TABLE 2

| Emulsifier 0.75% | Alkyl Sulfate | Alkylaryl Sulfonate | Sodium Laurate |
|---|---|---|---|
| Thermostability (minutes) | 20 | 25 | 70 |

As can be seen from the above, it is possible to produce, with the use of alkali salts of carboxylic acids as the emulsifiers, vinyl chloride polymers having a considerably higher thermostability than with the use of the other conventional types of emulsifiers.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for the production of powdery polymers of vinyl chloride having improved plastisol properties and containing no more than 2% by weight of particles having a diameter greater than 40 microns, which comprises spray drying the polymer dispersion obtained by the aqueous emulsion polymerization of an emulsion containing at least 45% by weight of monomers, in the presence of a sodium or potassium salt of a fatty acid of 8-18 carbon atoms as the emulsifier and a water-soluble free radical generating catalyst to a conversion of at least 80%, the polymerization being conducted either (a) discontinuously in a reactor having a capacity of at least 6 m$^3$ and in the presence of no more than 1% by weight of emulsifier, based on the polyvinyl chloride, with at least the portion of the polymerization above a conversion of 30% being conducted in a pH range of 9.5-11.5; or (b) continuously in the presence of no more than 2% by weight of emulsifier, based on the polyvinyl chloride, in a pH range throughout the polymerization of 9.5-11.5; and which comprises the step of adjusting the pH of the resultant polymer dispersion to a pH of 6-7.5 before the spray-drying step or to a pH of 4-7.5 during the spray-drying step to produce said powdery polymers of vinyl chloride having improved plastisol properties and containing no more than 2% by weight of particles having a diameter greater than 40 microns.

2. A process according to claim 1, wherein the discontinuous method (a) is employed and the entire polymerization is conducted in a pH range of 9.5-11.5 to 85-95% conversion.

3. A process according to claim 1, wherein the discontinuous method (a) is employed and the polymerization is conducted up to a conversion of 85-95%, the conversion up to 15% being conducted in a pH range of 6-6.5 and the conversion from 15 to 30% being conducted in a pH range of 6.5-7.5.

4. A process according to claim 1, wherein the pH adjustment step is effected on a latex having a temperature of 30°-60° C.

5. A process according to claim 1, wherein the emulsifier employed is sodium laurate or sodium myristate.

6. A process according to claim 1 wherein the continuous method (b) is employed to a conversion of 85-93%.

7. A process according to claim 1 wherein the pH adjustment step is conducted during the spray-drying step.

8. A process according to claim 1 wherein the pH adjustment step is conducted before the spray-drying step.